US010114797B2

(12) United States Patent
Guo et al.

(10) Patent No.: US 10,114,797 B2
(45) Date of Patent: Oct. 30, 2018

(54) METHODS AND APPARATUS FOR PROVIDING A PROGRAMMABLE MIXED-RADIX DFT/IDFT PROCESSOR USING VECTOR ENGINES

(71) Applicants: Yuanbin Guo, Mountain House, CA (US); Hong Jik Kim, San Jose, CA (US)

(72) Inventors: Yuanbin Guo, Mountain House, CA (US); Hong Jik Kim, San Jose, CA (US)

(73) Assignee: Cavium, LLC, Santa Clara, CA (US)

( * ) Notice: Subject to any disclaimer, the term of this patent is extended or adjusted under 35 U.S.C. 154(b) by 85 days.

(21) Appl. No.: 15/272,332

(22) Filed: Sep. 21, 2016

(65) Prior Publication Data

US 2017/0192936 A1    Jul. 6, 2017

Related U.S. Application Data

(60) Provisional application No. 62/274,062, filed on Dec. 31, 2015, provisional application No. 62/274,686, filed on Jan. 4, 2016, provisional application No. 62/279,345, filed on Jan. 15, 2016.

(51) Int. Cl.
  *G06F 17/14* (2006.01)
  *G06F 17/16* (2006.01)
  *H04W 16/18* (2009.01)

(52) U.S. Cl.
  CPC ............ *G06F 17/141* (2013.01); *G06F 17/16* (2013.01); *H04W 16/18* (2013.01)

(58) Field of Classification Search
  CPC .............................. G06F 17/141; G06F 17/16
  USPC ................................................... 708/400–409
  See application file for complete search history.

(56) References Cited

U.S. PATENT DOCUMENTS

| 8,825,729 | B1* | 9/2014 | Cope | G06F 17/142 |
| | | | | 708/404 |
| 9,170,985 | B1* | 10/2015 | Langhammer | G06F 17/142 |
| 2010/0174769 | A1* | 7/2010 | Modlin | G06F 17/142 |
| | | | | 708/404 |
| 2014/0280420 | A1* | 9/2014 | Khan | G06F 17/142 |
| | | | | 708/404 |

* cited by examiner

*Primary Examiner* — Tan V. Mai
(74) *Attorney, Agent, or Firm* — James M. Wu; JW Law Group

(57) ABSTRACT

A programmable vector processor ("PVP") capable of calculating discrete Fourier transform ("DFT/IDFT") values is disclosed. In an exemplary embodiment, an apparatus includes a memory bank and a vector data path pipeline coupled to the memory bank. The apparatus also includes a configurable mixed radix engine coupled to the vector data path pipeline. The configurable mixed radix engine is configurable to perform a selected radix computation selected from a plurality of radix computations. The configurable mixed radix engine performs the selected radix computation on data received from the memory bank through the pipeline to generate a radix result. The apparatus also includes a controller that controls how many radix computation iterations will be performed to compute an N-point DFT/IDFT based on a radix factorization.

18 Claims, 10 Drawing Sheets

300

| INDEX | 34 | 33 | 32 | 31 | 30 | 29 | 28 |
|---|---|---|---|---|---|---|---|
| $N_{RB}^{UL}$ | 108 | 100 | 96 | 90 | 81 | 80 | 75 |
| N_DFT | 1296 | 1200 | 1152 | 1080 | 972 | 960 | 900 |

| INDEX | 27 | 26 | 25 | 24 | 23 | 22 | 21 |
|---|---|---|---|---|---|---|---|
| $N_{RB}^{UL}$ | 72 | 64 | 60 | 54 | 50 | 48 | 45 |
| N_DFT | 864 | 768 | 720 | 648 | 600 | 576 | 540 |

| INDEX | 20 | 19 | 18 | 17 | 16 | 15 | 14 |
|---|---|---|---|---|---|---|---|
| $N_{RB}^{UL}$ | 40 | 36 | 32 | 30 | 27 | 25 | 24 |
| N_DFT | 480 | 432 | 384 | 360 | 324 | 300 | 288 |

| INDEX | 13 | 12 | 11 | 10 | 9 | 8 | 7 |
|---|---|---|---|---|---|---|---|
| $N_{RB}^{UL}$ | 20 | 18 | 16 | 15 | 12 | 10 | 9 |
| N_DFT | 240 | 216 | 192 | 180 | 144 | 120 | 108 |

| INDEX | 6 | 5 | 4 | 3 | 2 | 1 | 0 |
|---|---|---|---|---|---|---|---|
| $N_{RB}^{UL}$ | 8 | 6 | 5 | 4 | 3 | 2 | 1 |
| N_DFT | 96 | 72 | 60 | 48 | 36 | 24 | 12 |

FIG. 3

METHODS AND APPARATUS FOR PROVIDING A PROGRAMMABLE MIXED-RADIX DFT/IDFT PROCESSOR USING VECTOR ENGINES

CLAIM TO PRIORITY

This application claims the benefit of priority based upon U.S. Provisional Patent Application having Application No. 62/274,062, filed on Dec. 31, 2015, and entitled "METHOD AND APPARATUS FOR PROVIDING PROGRAMMABLE MIXED RADIX DFT PROCESSOR USING VECTOR ENGINES" and U.S. Provisional Patent Application having Application No. 62/274,686, filed on Jan. 4, 2016, and entitled "METHOD AND APPARATUS FOR DYNAMICALLY GENERATING MIXED-RADIX TWIDDLE COEFFICIENT VECTORS" and U.S. Provisional Patent Application having Application No. 62/279,345, filed on Jan. 15, 2016, and entitled "METHOD AND APPARATUS FOR PROVIDING PROGRAMMABLE MIXED-RADIX DFT/IDFT PROCESSOR USING VECTOR MEMORY SUBSYSTEM" all of which are hereby incorporated herein by reference in their entirety.

FIELD

The exemplary embodiments of the present invention relate to the design and operation of telecommunications networks. More specifically, the exemplary embodiments of the present invention relate to receiving and processing data streams in a wireless communication network.

BACKGROUND

There is a rapidly growing trend for mobile and remote data access over a high-speed communication networks, such as 3G or 4G cellular networks. However, accurately delivering and deciphering data streams over these networks has become increasingly challenging and difficult. High-speed communication networks which are capable of delivering information include, but are not limited to, wireless networks, cellular networks, wireless personal area networks ("WPAN"), wireless local area networks ("WLAN"), wireless metropolitan area networks ("MAN"), or the like. While WPAN can be Bluetooth or ZigBee, WLAN may be a Wi-Fi network in accordance with IEEE 802.11 WLAN standards.

To communicate high speed data over a communication network, such as a long term evolution (LTE) communication network, the network needs to support many configurations and process data utilizing different FFT sizes. A variety of architectures have been proposed for pipelined FFT processing that are capable of processing an uninterrupted stream of input data samples while producing a stream of output data samples at a matching rate. However, these architectures typically utilize multiple stages of FFT radix processors organized in a pipelined mode. The data is streamed into a first stage to complete a first radix operation and then the data is stream to subsequent stages for subsequent radix operations.

Thus, conventional pipelined architectures utilize multiple physical radix processors laid out in series to create the pipeline for streaming in/out data. The number of stages utilized is determined by the largest FFT size to be supported. However, this design becomes more complex when processing a variety of FFT sizes that require mixed-radix (2, 3, 4, 5, and 6) processing typically used in cellular (e.g., LTE) transceivers. As a result, the drawbacks of conventional systems are not only the amount of hardware resources utilized, but also the difficulty to configure such a system with the many different FFT sizes and mixed-radix factorization schemes utilized in an LTE transceiver.

Therefore, it is desirable to have a pipelined FFT architecture that is faster and consumes fewer resources than conventional systems. The architecture should have a higher performance to power/area ratio than the conventional architectures, and achieve much higher scalability and programmability for all possible mix-radix operations.

SUMMARY

The following summary illustrates simplified versions of one or more aspects of present invention. The purpose of this summary is to present some concepts in a simplified description as more detailed descriptions are provided below.

A programmable vector processor ("PVP") capable of calculating discrete Fourier transform ("DFT") values is disclosed. The PVP includes a ping-pong vector memory bank, a twiddle factor generator, and a programmable vector mixed radix engine that communicate data through a vector pipeline. The ping-pong vector memory bank is able to store input data and feedback data with optimal storage contention. The twiddle factor generator generates various twiddle values for DFT calculations. The programmable vector mixed radix engine is configured to provide one of multiple DFT radix results. For example, the programmable vector mixed radix engine can be programmed to perform radix3, radix4, radix 5 and radix6 DFT calculations. In one embodiment, the PVP also includes a vector memory address generator for producing storage addresses, and a vector dynamic scaling factor calculator capable of determining scaling values.

In an exemplary embodiment, an apparatus includes a vector memory bank and a vector data path pipeline coupled to the vector memory bank. The apparatus also includes a configurable mixed radix engine coupled to the vector data path pipeline. The configurable mixed radix engine is configurable to perform a selected radix computation selected from a plurality of radix computations. The configurable mixed radix engine performs the selected radix computation on data received from the vector memory bank through the vector pipeline to generate a radix result. The apparatus also includes a controller that controls how many radix computation iterations will be performed to compute an N-point DFT based on a radix factorization.

In an exemplary embodiment, a method for performing an N-point DFT is disclosed. The method includes determining a radix factorization to compute the N-point DFT, the radix factorization determines one or more stages of radix calculations to be performed. The method also includes performing an iteration for each radix calculation. Each iteration includes reading data from a vector memory bank into a vector data path pipeline, configuring a configurable mixed radix engine to perform a selected radix calculation, performing the selected radix calculation on the data in the vector data path pipeline, storing a radix result of the selected radix calculation back into the vector memory bank, if the current iteration is not the last iteration, and outputting the radix result of the selected radix calculation as the N-point DFT result, if the current iteration is the last iteration.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

FIG. 3 is a table showing DFT/IDFT sizes with respect to index and resource block ("RB") allocations in accordance with exemplary embodiments of the present invention;

DETAILED DESCRIPTION

Figure 1:
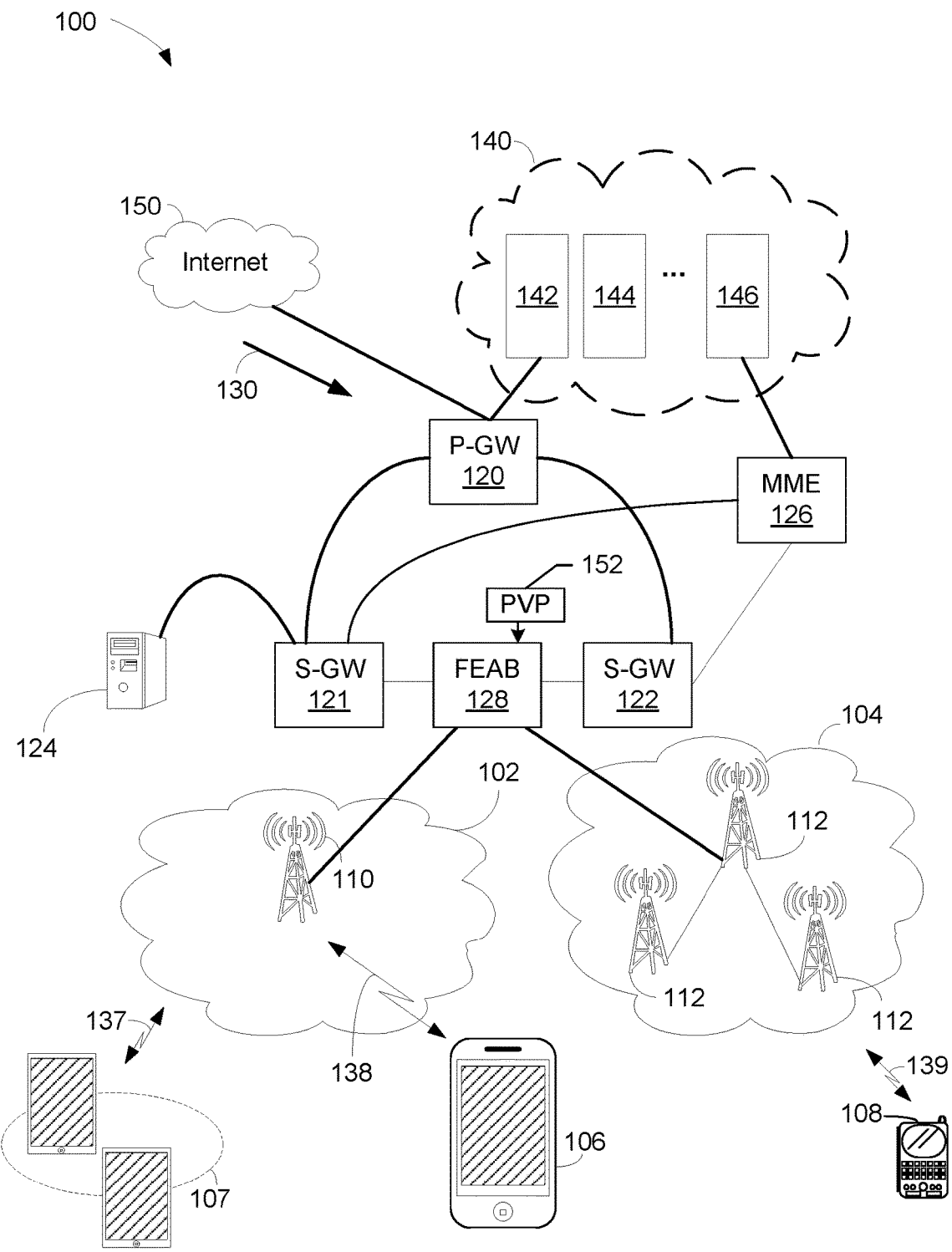
FIG. 1 is a block diagram illustrating a computing network configured to transmit data streams using a programmable vector processor in accordance with exemplary embodiments of the present invention.

Aspects of the present invention are described herein the context of a methods and/or apparatus for processing control information relating to wireless data.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

FIG. 1 is a diagram illustrating a computing network 100 configured to transmit data streams using a programmable vector processor in accordance with exemplary embodiments of the present invention. The computer network 100 includes packet data network gateway ("P-GW") 120, two serving gateways ("S-GWs") 121-122, two base stations (or cell sites) 102-104, server 124, and Internet 150. P-GW 120 includes various components 140 such as billing module 142, subscribing module 144, tracking module 146, and the like to facilitate routing activities between sources and destinations. It should be noted that the underlying concepts of the exemplary embodiments of the present invention would not change if one or more blocks (or devices) were added or removed from computer network 100.

The configuration of the computer network 100 may be referred to as a third generation ("3G"), 4G, LTE, 5G, or combination of 3G and 4G cellular network configuration.

MME 126, in one aspect, is coupled to base stations (or cell site) and S-GWs capable of facilitating data transfer between 3G and LTE (long term evolution) or between 2G and LTE. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipment. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 3G and 4G (or LTE) packet core networks.

Sectors or blocks 102-104 are coupled to a base station or FEAB 128 which may also be known as a cell site, node B, or eNodeB. Sectors 102-104 include one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base station or cell site can include additional radio towers as well as other land switching circuitry.

Server 124 is coupled to P-GW 120 and base stations 102-104 via S-GW 121 or 122. In one embodiment, server 124 which contains a soft decoding scheme 128 is able to distribute and/or manage soft decoding and/or hard decoding based on predefined user selections. In one exemplary instance, upon detecting a downstream push data 130 addressing to mobile device 106 which is located in a busy traffic area or noisy location, base station 102 can elect to decode the downstream using the soft decoding scheme distributed by server 124. One advantage of using the soft decoding scheme is that it provides more accurate data decoding, whereby overall data integrity may be enhanced.

When receiving bit-streams via one or more wireless or cellular channels, a decoder can optionally receive or decipher bit-streams with hard decision or soft decision. A hard decision is either 1 or 0 which means any analog value greater than 0.5 is a logic value one (1) and any analog value less than 0.5 is a logic value zero (0). Alternatively, a soft decision or soft information can provide a range of value from 0, 0.2, 0.4, 0.5, 0.6, 0.8, 0.9, and the like. For example, soft information of 0.8 would be deciphered as a highly likelihood one (1) whereas soft information of 0.4 would be interpreted as a weak zero (0) and maybe one (1).

A base station, in one aspect, includes one or more FEABs 128. For example, FEAB 128 can be a transceiver of a base station or eNodeB. In one aspect, mobile devices such tables or iPad® 107 uses a first type of RF signals to communicate with radio tower 110 at sector 102 and portable device 108 uses a second type of RF signals to communicate with radio tower 112 at sector 104. In an exemplary embodiment, the FEAB 128 comprises an exemplary embodiment of a PVP 152. After receiving RF samples, FEAB 128 is able to process samples using the PVP 152 in accordance with the exemplary embodiments. An advantage of using the PVP 152 is to improve throughput as well as resource conservation.

Figure 2:
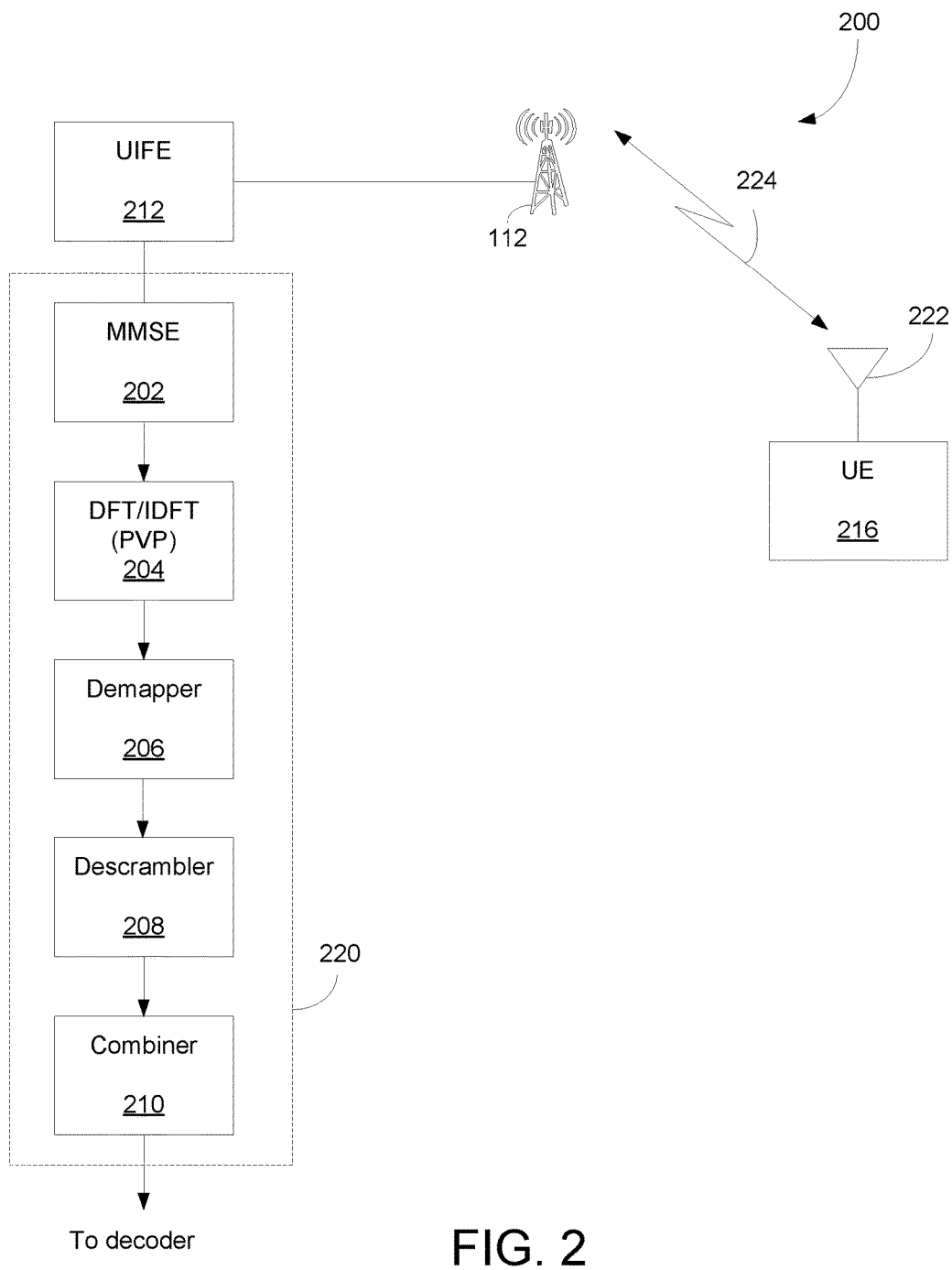
FIG. 2 is a block diagram illustrating logic flows of data streams traveling through a transceiver that includes a programmable vector processor in accordance with the exemplary embodiments of the present invention.

FIG. 2 is a block diagram 200 illustrating logic flows of data streams traveling through a transceiver that includes a programmable mixed-radix processor in accordance with the exemplary embodiments of the present invention. Diagram 200 includes user equipment ("UE") 216, uplink front end ("ULFE") 212, transceiver processing hardware ("TPH") 220, and base station 112. Base station 112 is capable of transmitting and receiving wireless signals 224 to and from TPH 220 via an antenna 222. It should be noted that the underlying concept of the exemplary embodiments of the present invention would not change if one or more devices (or base stations) were added or removed from diagram 200.

The TPH 220, in one example, includes MMSE 202, DFT/IDFT 204, and demapper 206, and is able to process and/or handle information between antenna 222 and a decoder. The information includes data and control signals wherein the control signals are used to facilitate information transmission over a wireless communication network. While MMSE may include an estimator able to provide an estimation based on prior parameters and values associated with bit streams, DFT/IDFT 204 converts symbols or samples between time and frequency domains. After conversion, DFT/IDFT 204 may store the symbols or samples in a storage matrix.

In one embodiment, DFT/IDFT 204 includes one or more programmable vector processors that determine DFT/IDFT values. Depending on the applications, DFT/IDFT 204 can transmit determined symbols to the next logic block such as demapper 208. In an exemplary embodiment, the storage matrix is a local storage memory which can reside in DFT/IDFT 204, demapper 206, or an independent storage location.

The MMSE 202, in one example, includes an equalizer with serial interference cancellation ("SIC") capability and provides possible processing paths between TPH and SIC path. MMSE 202, which can be incorporated in TPH 220, generates estimated value using a function of mean-square-error or equalization of received signals or bit stream(s) during the signal processing phase. MMSE 202 also provides functionalities to equalize multiple streams of data received simultaneously over the air. For instance, the number of bit streams such as one (1) to eight (8) streams can arrive at antenna 222 simultaneously. MMSE 202 also supports frequency hopping and multi-cluster resource block ("RB") allocations. Note that the frequency offset may be used to compensate channel estimates before performing time interpolation. Time interpolation across multiple symbols may be performed in multiple modes.

The Demapper 206, in one aspect, includes a first minimum function component ("MFC"), a second MFC, a special treatment component ("STC"), a subtractor, and/or an LLR generator. A function of demapper 206 is to demap or ascertain soft bit information associated to received symbol(s) or bit stream(s). For example, demapper 206 employs soft demapping principle which is based on computing the log-likelihood ratio (LLR) of a bit that quantifies the level of certainty as to whether it is a logical zero or one. To reduce noise and interference, demapper 206 is also capable of discarding one or more unused constellation points relating to the frequency of the bit stream from the constellation map.

In an exemplary embodiment, the DFT/IDFT 204 converts signals between the frequency domain and the time domain using a discrete Fourier transform ("DFT") and an inverse DFT ("IDFT"). The DFT and IDFT can be defined as;

$$DFT: X[k] = \sum_{n=0}^{N-1} x[n]W_N^{kn}$$

and $$IDFT: x[n] = \frac{1}{\sqrt{N}} \sum_{k=0}^{N-1} X[k]W_N^{-kn}$$

where $W_N = e^{-2\pi j/N}$.

In the above expressions, the output is properly scaled after all radix states so that the average power of DFT/IDFT output is the same as the input.

FIG. 3 is a table 300 showing DFT/IDFT sizes with respect to index and resource block ("RB") allocations in accordance with exemplary embodiments of the present invention. In one embodiment, LTE networks are generally required to support many different configurations using different DFT sizes with mixed radix computations. For example, an N-point DFT can be determine from the following radix factorization.

$$N=2^\alpha 3^\beta 5^\gamma$$

Thus, for a DFT of size N, a factorization can be determined that identifies the radix2, radix3 and radix5 computations to be performed to compute the DFT result. In various exemplary embodiments, the PVP operates to use a vector pipeline and associated vector feedback path to perform an iterative process to compute various radix factorizations when determining DFT/IDFT values.

Figure 4:
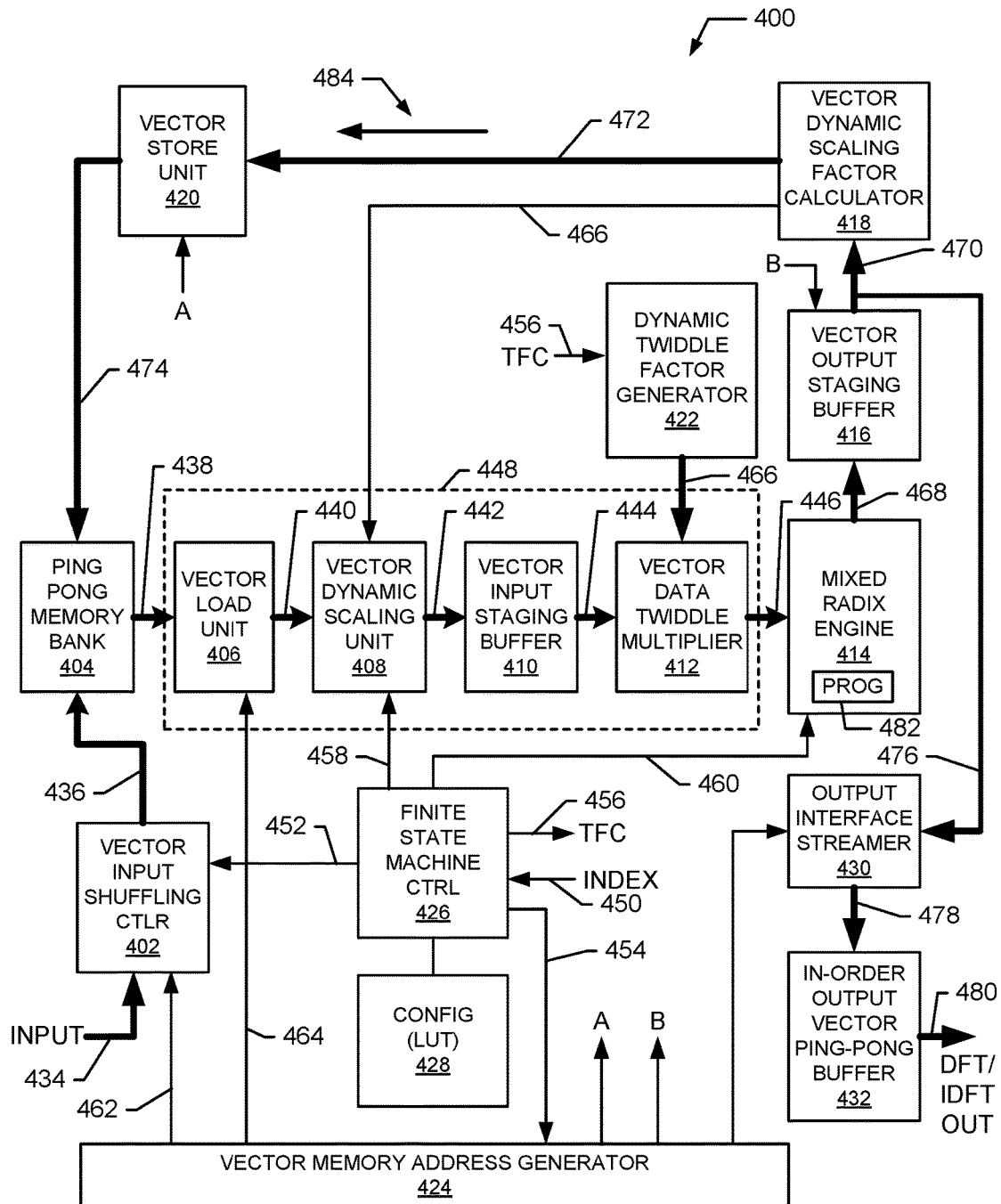
FIG. 4 is a block diagram illustrating an exemplary embodiment of a programmable vector processor in accordance with exemplary embodiments of the present invention.

FIG. 4 is a block diagram illustrating an exemplary embodiment of a PVP 400 in accordance with the present invention. In one embodiment, the PVP 400 comprise one single programmable vector mixed-radix engine 414 that is a common logic block reused for all the different radix sizes calculations. Thus, the vector engine 414 is reused iteratively as the ALU (Arithmetic Logic Unit) of the PVP 400. Complex control logic and memory sub-systems are used as described herein to load/store data in a multiple-stage radix computation by iteratively feeding data to the single vector mixed-radix engine 414. In another exemplary embodiment, multiple vector engines 414 are utilized.

Exemplary embodiments of the PVP 400 satisfy the desire for low power consumption and reduced hardware resources by iteratively reusing a single pipelined common vector data-path for all possible combinations of mixed-radix computations, yet still achieving streaming in/output data throughput of multiple samples/cycle with much less logic utilization. Besides its much higher performance to power/area ratio over conventional architectures, exemplary embodiments of the PVP 400 achieve much higher scalability and programmability for all possible mix-radix operations.

In an exemplary embodiment, the PVP 400 also comprises vector input shuffling controller 402, ping-pong memory bank 404, vector load unit 406, vector dynamic scaling unit 408, vector input staging buffer 410, vector data twiddle multiplier 412, vector output staging buffer 416, vector dynamic scaling factor calculator 418, vector store unit 420, dynamic twiddle factor generator 422, vector memory address generator 424, finite state machine controller 426, configuration list 428 output interface streamer 430 and in-order output vector ping-pong buffer 432. In an exemplary embodiment, the vector load unit 406, vector dynamic scaling unit 408, vector input staging buffer 410, and vector data twiddle multiplier 412 form a vector data-path pipeline 448 that carries vector data from the memory 404 to the vector mixed-radix engine 414. The vector output staging buffer 416, vector dynamic scaling factor calculator 418, and vector store unit 420 for a vector feedback data-path 484 that carries vector data from the vector mixed-radix engine 414 to the memory 404.

In an exemplary embodiment, the finite state machine controller 426 receives an index value 450 from another entity in the system, such as a central processor of the DFT/IDFT 204. Using the index value, the state machine 426 accesses the configuration information 428 to determine the size (N) of the DFT/IDFT to be performed. For example, the configuration information 428 includes the table 300 that cross-references index values with size (N) values. Once the DFT/IDFT size is determined, the state machine 426 accesses the configuration information 428 to determine a factorization that identifies the number and type of radix computations that need to be performed to complete the DFT/IDFT operation.

Once the radix factorization is determined, the state machine 426 provides input shuffling control signals 452 to the vector input shuffling controller 402 that indicate how input data 434 is to be written into the memory 404 to allow efficient readout into the vector pipeline 448. The state machine 426 also provides address control signals 454 to the vector memory address generator 424 that indicate how memory addresses are to be generated to read-out, store, move and otherwise process data throughout the PVP 400. The state machine 426 also generated twiddle factor control (TFC) signals 456 that are input to twiddle factor generator 422 to indicate how twiddle factor are to be generated for use by the twiddle multiplier 412. The state machine 426 also generates scaling control signals 458 that are input to the scaling unit 408 to indicate how pipeline vector data is to be scaled. The state machine 426 also generates radix engine control signals 460 that indicate how the mixed radix engine is to perform the DFT/IDFT calculations based on the radix factorization.

In an exemplary embodiment, the vector input shuffling controller 402 receives streaming input data 434 at the draining throughput of the previous module in the system with a rate of up to 12 samples/cycle. However, this is exemplary and other rates are possible. The shuffling controller 402 uses a vector store operation to write the input data 434 into the ping-pong vector memory bank 404. For example, the shuffling controller 402 receives the control signals 452 from the state machine 426 and address information 462 from the address generator 424 and uses this information to shuffling and/or organize the input data 434 so that it can be written into the memory bank 404. For example, parallel data path 436 carries parallel input data to be written to the ping-pong memory bank 404. After the shuffling operation, all the data are stored in a matrix pattern in the ping-pong vector memory bank 404 to allow efficient data read-out to facilitate the selected multi-stage radix-operation with in-order write-back. In an exemplary embodiment, the ping-pong memory bank 404 includes "ping" and "pong" memory banks that may be selectively written to or read from to facilitate efficient data flow.

In an exemplary embodiment, the vector load unit 406 reads the data in parallel for the multiple radix-operations from either the ping or pong memory banks 404 to feed the down-stream operations. For example, the vector load unit 406 receives address information 464 from the address generator 424 which indicates how data is to be read from the memory bank 404. For example, parallel data path 438 carries parallel data read from the ping-pong memory banks 404 to the vector load unit 406. The vector load unit 406 can generate full throughput (e.g., 12 samples/cycle) at the output of vector load unit 406 with no interruption. For example, parallel data path 440 carries parallel data output from the vector load unit 406 to the scaling unit 408.

In an exemplary embodiment, the vector dynamic scaling unit 408 scales all the parallel samples within one cycle to keep the signal amplitude within the bit-width of the main data-path after each stage of radix computation. A scaling factor 466 is calculated by the vector dynamic scaling factor calculator 418 without stalling the pipeline for each iteration. The scaling factor 466 and the scaling control signals 458 are used by the vector dynamic scaling unit 408 to perform the scaling operation. For example, parallel data path 442 carries scaled parallel data output from the vector dynamic scaling unit 408 after the scaling operation is performed.

In an exemplary embodiment, the vector input staging buffer 410 comprises an array of vector registers that are organized in a matrix pattern. The scaled vector-loaded data originating from the main ping-pong memory bank 404 and carried on data path 442 is written column-wise into the array of vector staging registers. The registers are then read out row-wise to form the parallel data input to the vector data twiddle multiplier 412. For example, the data path 444 carries parallel data output from the vector input staging buffer 410 to the vector data twiddle multiplier 412.

In an exemplary embodiment, vector data twiddle multiplier 412 multiplies the scaled and staged samples with twiddle factors received by the dynamic twiddle factor generator 422 over signal path 466. The dynamic twiddle factor generator 422 receives the TFC 456 and generates twiddle factors to be multiplied with the scaled data. The vector data twiddle multiplier 412 generates 12 samples/cycle of input for radixes (2,3,4,6) scenarios or 10-samples for the radix-5 scenario to feed into the programmable vector mix-radix engine 414 using signal path 446.

The mixed-radix engine 414 uses a pipelined data-path to implement multiple vector radix operations for all the different radix-factorization schemes. It is controlled by a radix-mode program controller 482 within the engine for each iteration stage. The engine data-path reuses the same logic for all the different combinations of radix operations. As an example, it can reuse the common functional logic to compute multiple radix3, radix4, radix5 and radix6 computations with no pipeline stall. For example, in an exemplary embodiment, the engine 414 can be reconfigured to compute four (4) radix3, three (3) radix4, two (2) radix5, or two (2) radix6 computations with no pipeline stall. A more detailed description of the mixed radix engine 414 is provided below.

The vector memory address generator 424 operates to provide memory address and control information to the vector input shuffling controller 402, vector load unit 406, vector store unit 420 (see A), vector output staging buffer 416 (see B), and the output interface streamer 430. The addresses coordinate the flow of data into the memory bank 404 and through the pipeline 448 to the mixed radix engine 414. Processed data is output from the engine 414 and input to the vector output staging buffer 416 on the vector feedback data path 484 that leads back to the ping-pong memory 404. For example, after the data passes through the vector dynamic scaling factor calculator 418, it flows to the vector store unit 420, which uses the address information (A) it receives to store the data back into the ping-pong memory 404.

In an exemplary embodiment, the PVP 400 determines a DFT/IDFT conversion by performing multiple iterations where in each iteration, a particular radix calculation is performed. Thus, in an exemplary embodiment, after performing intermediate radix computations, the intermediate results are stored back into the memory 404. For example, the intermediate radix results are output to the vector output staging buffer 416 using the vector data path 468. The vector output staging buffer 416 uses address and control information (B) received from the address generator 424 to receive the intermediate radix results and output the results in an appropriate order the vector dynamic scaling factor calculator 418 using vector data path 470.

The vector dynamic scaling factor calculator 418 calculates scaling factors from the received radix results and outputs the scaling factors 466 to the dynamic scaling factor unit 408. The radix results are then forward to the vector store unit 420 using vector data path 472. The vector store unit 420 receive address and control information (A) from the address generator 424 and stored the received vector data in the ping-pong memory bank 404 according to the received control and address information. In an exemplary embodiment, the intermediate vector radix results are stored in-place corresponding to the data that was used to generate the radix results. In an exemplary embodiment, the staging buffer 416, scaling factor calculator 418 and vector store unit 420 form a vector feedback data path 484 to allow results from the mixed radix engine 414 to be stored into the memory 404.

In an exemplary embodiment, a final iteration is performed where the mixed radix engine 414 computes a resulting DFT/IDFT. The results are output from the vector output staging buffer 416 to the output interface streamer 430 using vector data path 476. The output interface streamer 430 receive processed data from the output staging buffer 416 and outputs this data to the in-order output vector ping-pong buffer 432 using the vector data path 478. The in-order output vector ping-pong buffer 432 outputs the DFT/IDFT data 480 to downstream entities in the correct order.

Computational Iterations

In an exemplary embodiment, the PVP 400 operates to compute a desired DFT/IDFT using multiple iterations where in each iteration a particular radix calculation is performed. For example, the PVP 400 initially computes a radix factorization to determine the radix computations to be made to compute the DFT/IDFT for the given point size N. Data is stored in the memory 404 and read out into the vector pipeline 448 where it is scaled, staged, and multiplied by twiddle factors. The results are input to the mixed radix engine 414 that is configured to perform a first radix computation. The intermediate radix result is written back to the memory bank 404 using the vector feedback path 484. A next iteration is performed to compute the next radix factor. The radix engine 414 is reconfigured to compute this next radix factor. The iterations continue until the complete DFT/IDFT is computed. The radix engine 414 then outputs the final result through the output staging buffer 416 over path 476 to the output interface streamer 430. Thus, to determine an N-point DFT/IDFT, a radix factorization is determined that is used to perform a selected number of iterations to calculate each radix factor. For each iteration the radix engine 414 is reconfigured to compute the desired radix computation. As a result, the PVP 400 uses a pipeline architecture to compute DFT/IDFT values with high speed and efficiency, while the reconfigurable radix engine 414 utilizes fewer resources.

Figure 5:
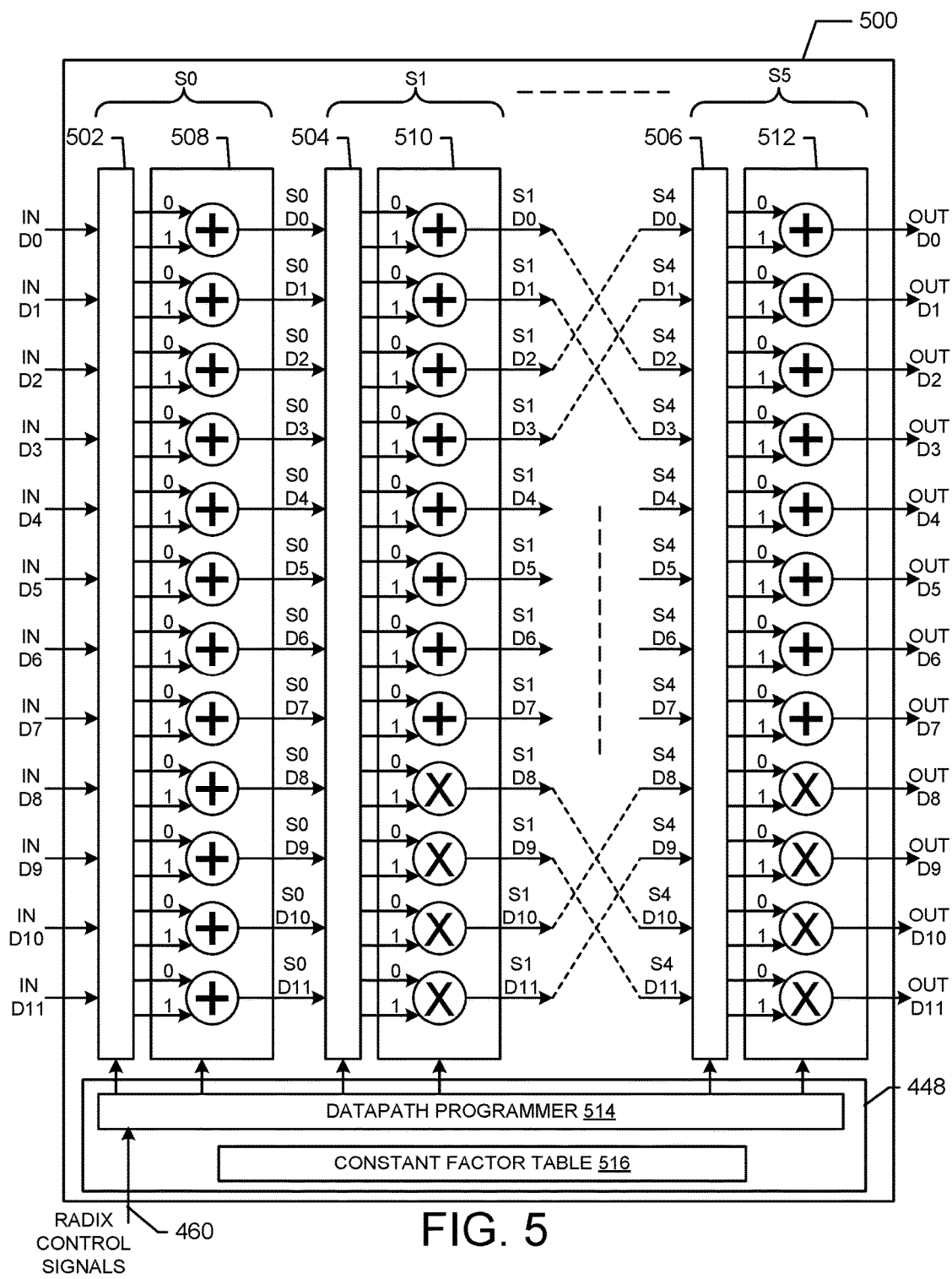
FIG. 5 is a block diagram illustrating a detailed exemplary embodiment of a programmable vector mixed-radix processor in accordance with exemplary embodiments of the present invention.

FIG. 5 is a block diagram illustrating a detailed exemplary embodiment of a programmable vector mixed-radix processor 500 in accordance with exemplary embodiments of the present invention. For example, the processor 500 is suitable for use as the programmable vector mixed-radix engine 414 shown in FIG. 4. The processor 500 includes multiple stages (S0-S5) that include complex ALU (Arithmetic Logic Unit) Arrays (e.g., shown at 508, 510, and 512) and connecting multiplexers (e.g., shown at 502, 504 and 506). The multiplexers and the ALUs of the stages (S0-S5) are configurable to allow the processor 500 to perform R2, R3, R4, R5, and R6 radix computations.

In an exemplary embodiment, the radix-mode program controller 482 comprises the data-path programmer 514 and the LUT 516. The data-path programmer 514 comprises at least one of logic, a processor, CPU, state machine, memory, discrete hardware and/or other circuitry that operates to allow the programmer 514 to reconfigure the ALU arrays and multiplexers based on the received radix engine control signals 460. A small LUT (Look Up-Table) 516 holds a set of constant scaling values for the radix equations.

In an exemplary embodiment, vector input data (IN D0-D11) is received at the mux 502. The vector input data is received from the twiddle multiplier 412 such that the generated twiddle factors have already been applied to the data. The mux 502 is configured by the programmer 514 based on the received radix engine control signals 460 to connect the input data to the ALU 508 in a particular connection pattern. The ALU 508 is configured by the programmer 514 to perform arithmetic operations (such as add the data and/or constants together) based on the received radix engine control signals 460. The results of the arithmetic operations of the ALU 508 (S0 D0-D11) are input to the mux 504 of stage S1.

In an exemplary embodiment, the stage S1 operates similarly to the stage S0. The mux 504 receives the data (S0 D0-D11) output from the stage S0 and connects this input data to the ALU 510 in a particular connection pattern. The mux 504 is configured by the programmer 514 based on the received radix engine control signals 460. The ALU 510 is configured by the programmer 514 to perform arithmetic operations (such as add and/or multiply the data and/or constants together) based on the received radix engine control signals 460. The results of the arithmetic operations of the ALU 510 (S1 D0-D11) are input to the mux of stage S2 (not shown).

In an exemplary embodiment, the stages S2-S4 operates similarly to the stage S1. The stage S4 outputs data (S4 D0-D11) that has been processed by these stages configured by the programmer 514 according to the received radix control signals 460. The mux 506 of the stage S5 receives the data processed by the stage S4 and connects this input data to the ALU 512 in a particular connection pattern. The mux 506 is configured by the programmer 514 based on the received radix engine control signals 460. The ALU 512 is configured by the programmer 514 to perform arithmetic operations (such as add and/or multiply the data and/or constants together) based on the received radix engine control signals 460. The results of the arithmetic operations of the ALU 512 (OUT D0-D11) are output from the processor 500. Thus, the processor 500 is re-configurable to perform a variety of radix computations on data received from the twiddle multiplier 412 of the pipeline 448. The radix computations include radix3, radix4, radix5 and radix6 DFT computations.

Figure 6:
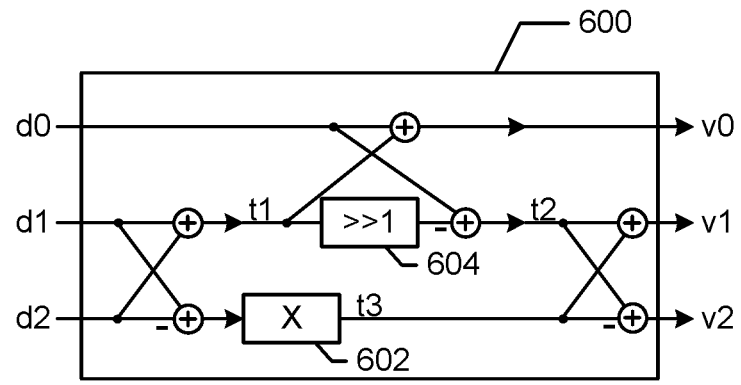
FIG. 6 is a block diagram of a radix3 configuration for use with the programmable vector mixed-radix processor in accordance with exemplary embodiments of the present invention.

FIG. 6 is a block diagram of a radix3 configuration 600 for use with the programmable vector mixed-radix processor 500 in accordance with exemplary embodiments of the present invention. For example, the stages (S0-S5) of the processor 500 can be configured to perform a radix3 computation using the configuration 600. In an exemplary embodiment, three data bits (d0-d2) are input to the configuration 600. The input data is added and a multiplication block 602 and a shift block 604 are utilized to generate three output bits (v0-v2) that represent the radix3 computation.

Figure 7:
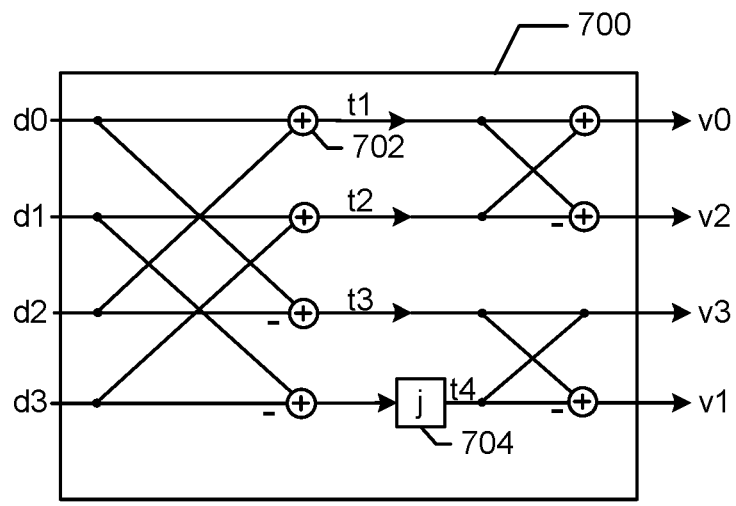
FIG. 7 is a block diagram of a radix4 configuration for use with the programmable vector mixed-radix processor in accordance with exemplary embodiments of the present invention.

FIG. 7 is a block diagram of a radix4 configuration 700 for use with the programmable vector mixed-radix processor 500 in accordance with exemplary embodiments of the present invention. For example, the stages (S0-S5) of the processor 500 can be configured to perform a radix4 computation using the configuration 700. In an exemplary embodiment, four data bits (d0-d3) are input to the configuration 700. The input data is added and a multiplication block 704 is utilized to generate four output bits (v0-v3) that represent the radix4 computation.

Figure 8:
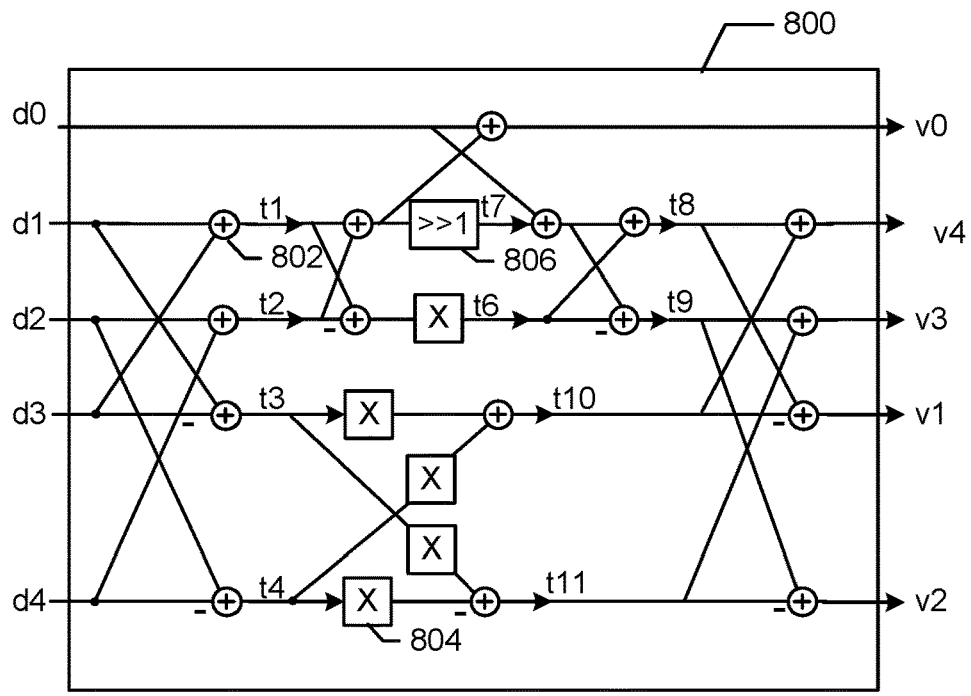
FIG. 8 is a block diagram of a radix5 configuration for use with the programmable vector mixed-radix processor in accordance with exemplary embodiments of the present invention.

FIG. 8 is a block diagram of a radix5 configuration 800 for use with the programmable vector mixed-radix processor 500 in accordance with exemplary embodiments of the present invention. For example, the stages (S0-S5) of the processor 500 can be configured to perform a radix5 computation using the configuration 800. Five data bits (d0-d4) are input to the configuration 800. Addition blocks (e.g., 802), multiplication blocks (e.g., 804), and shift block 806 are utilized to generate five output bits (v0-v4).

Figure 9:
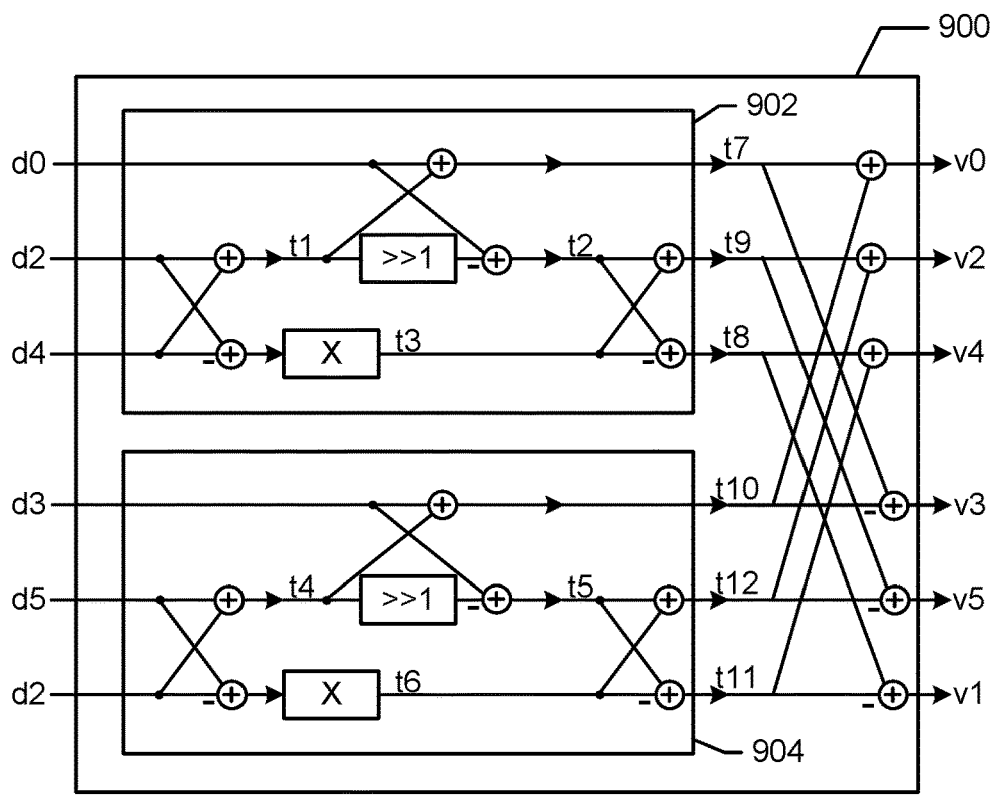
FIG. 9 is a block diagram of a radix6 configuration for use with the programmable vector mixed-radix processor in accordance with exemplary embodiments of the present invention.

FIG. 9 is a block diagram of a radix6 configuration 900 for use with the programmable vector mixed-radix processor 500 in accordance with exemplary embodiments of the present invention. For example, the stages (S0-S5) of the processor 500 can be configured to perform a radix6 computation using the configuration 900. Six data bits (d0-d5) are input to the configuration 900. The data bits are input to two blocks 902 and 904 that are configured for radix3 operation as shown in block 600. The outputs of the block 902 and 904 are combined to generate six output bits (v0-v5).

Figure 10:
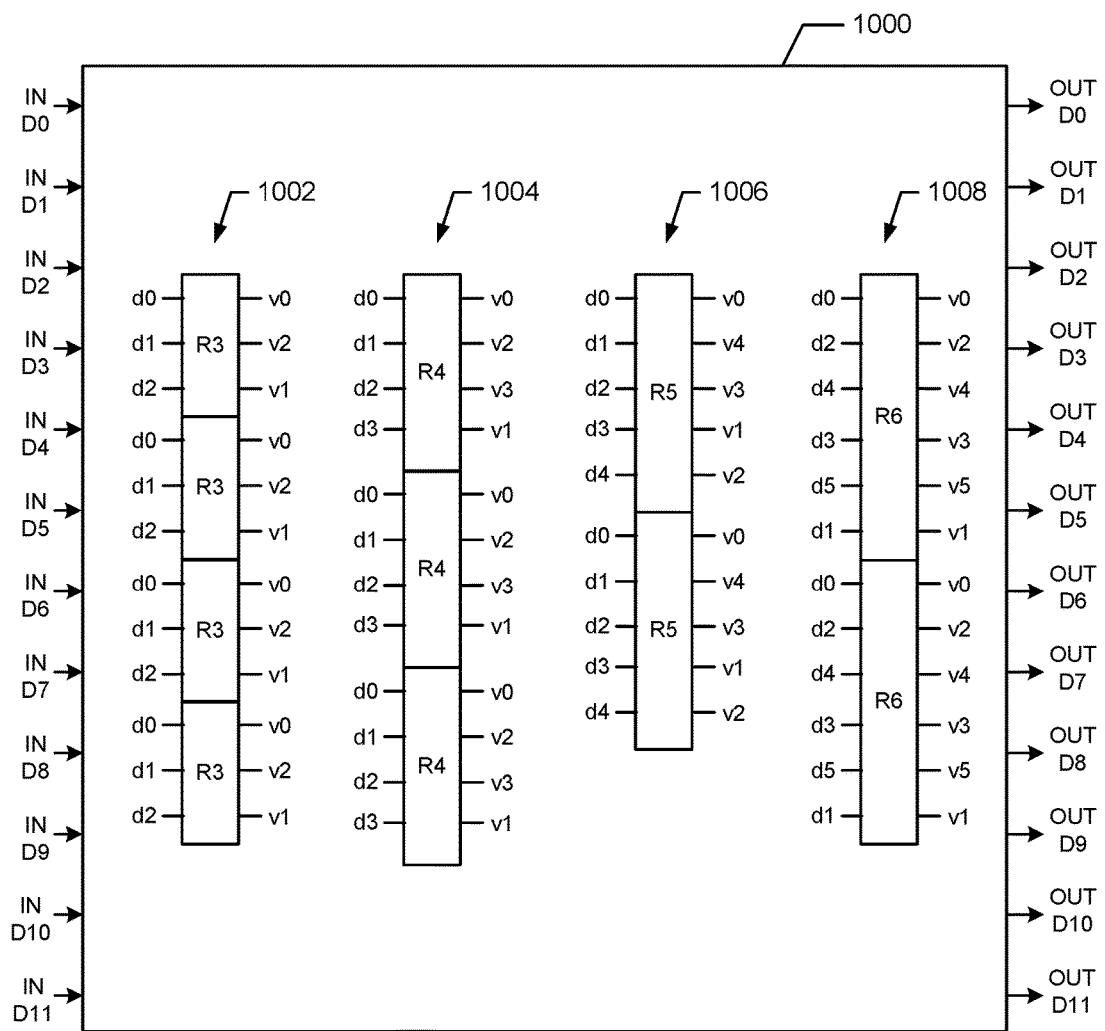
FIG. 10 is a block diagram illustrating a configurable vector mixed-radix engine in accordance with one embodiment of the present invention.

FIG. 10 is a block diagram illustrating a configurable vector mixed-radix engine 1000 in accordance with one embodiment of the present invention. For example, the engine 1000 is suitable for use as the engine 500 shown in FIG. 5. The engine 1000 comprises a radix-operator datapath that is configured to compute selected radix modes. In an exemplary embodiment, the radix-mode can be four parallel radix3 computations (4vR3 as shown in block 1002), or three parallel radix4 computations (3vR4 as shown in block 1004), or two parallel radix5 computations (2 vR5 in block 1006), or two parallel radix6 computations (2vR6 in block 1008). After each configuration is selected, data can be pipelined into each run-time data-path with no stall within the iteration stage. The input and output of 12-samples are selected according to the radix-mode and stage index based on the DFT/IDFT algorithm.

Figure 11:
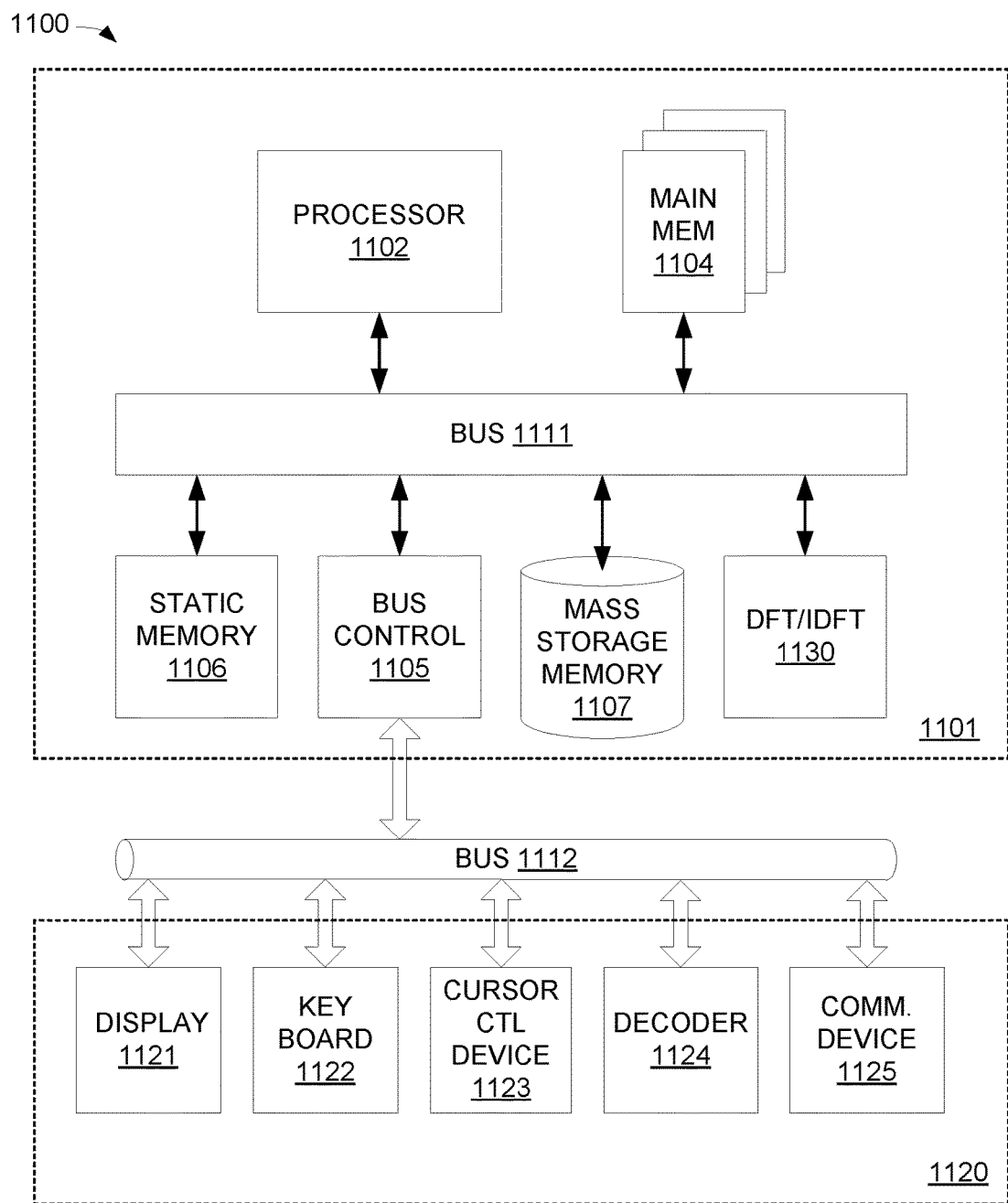
FIG. 11 illustrates an exemplary digital computing system that comprises a programmable vector processor having a configurable vector mixed-radix engine with iterative pipeline in accordance with embodiments of the invention.

FIG. 11 illustrates an exemplary digital computing system 1100 that comprises a programmable vector processor having a configurable vector mixed-radix engine with iterative pipeline in accordance with embodiments of the invention. It will be apparent to those of ordinary skill in the art that the programmable mixed-radix processor with iterative pipelined vector engine is suitable for use with other alternative computer system architectures.

Computer system 1100 includes a processing unit 1101, an interface bus 1112, and an input/output ("IO") unit 1120. Processing unit 1101 includes a processor 1102, main memory 1104, system bus 1111, static memory device 1106, bus control unit 1105, and mass storage memory 1107. Bus 1111 is used to transmit information between various components and processor 1102 for data processing. Processor 1102 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Mass storage memory 1107 may be a magnetic disk, solid-state drive ("SSD"), optical disk, hard disk drive, floppy disk, CD-ROM, and/or flash memories for storing large amounts of data.

I/O unit 1120, in one example, includes a display 1121, keyboard 1122, cursor control device 1123, decoder 1124, and communication device 1125. Display device 1121 may be a liquid crystal device, flat panel monitor, cathode ray tube ("CRT"), touch-screen display, or other suitable display device. Display device 1121 projects or displays graphical images or windows. Keyboard 1122 can be a conventional alphanumeric input device for communicating information between computer system 1100 and computer operator(s). Another type of user input device is cursor control device 1123, such as a mouse, touch mouse, trackball, or other type of cursor for communicating information between system 1100 and user(s).

Communication device 1125 is coupled to bus 1111 for accessing information from remote computers or servers through wide-area network. Communication device 1125 may include a modem, a router, or a network interface device, or other similar devices that facilitate communication between computer 1100 and the network. In one aspect, communication device 1125 is configured to perform wireless functions.

In one embodiment, DFT/IDFT component 1130 is coupled to bus 1111 and is configured to provide a high speed programmable vector processor having a configurable vector mixed-radix engine with iterative pipeline in accordance with embodiments of the invention. For example, DFT/IDFT 1130 can be configured to include the PVP 400 shown in FIG. 4. The DFT/IDFT component 1130 can be hardware, hardware executing software, firmware, or a combination of hardware and firmware. For example, the component 1130 operates to receive streaming data and compute a desired N-point DFT that is output from the component 1130. Accordingly, the component 1130 may also operate to compute a desired IDFT.

Figure 12:
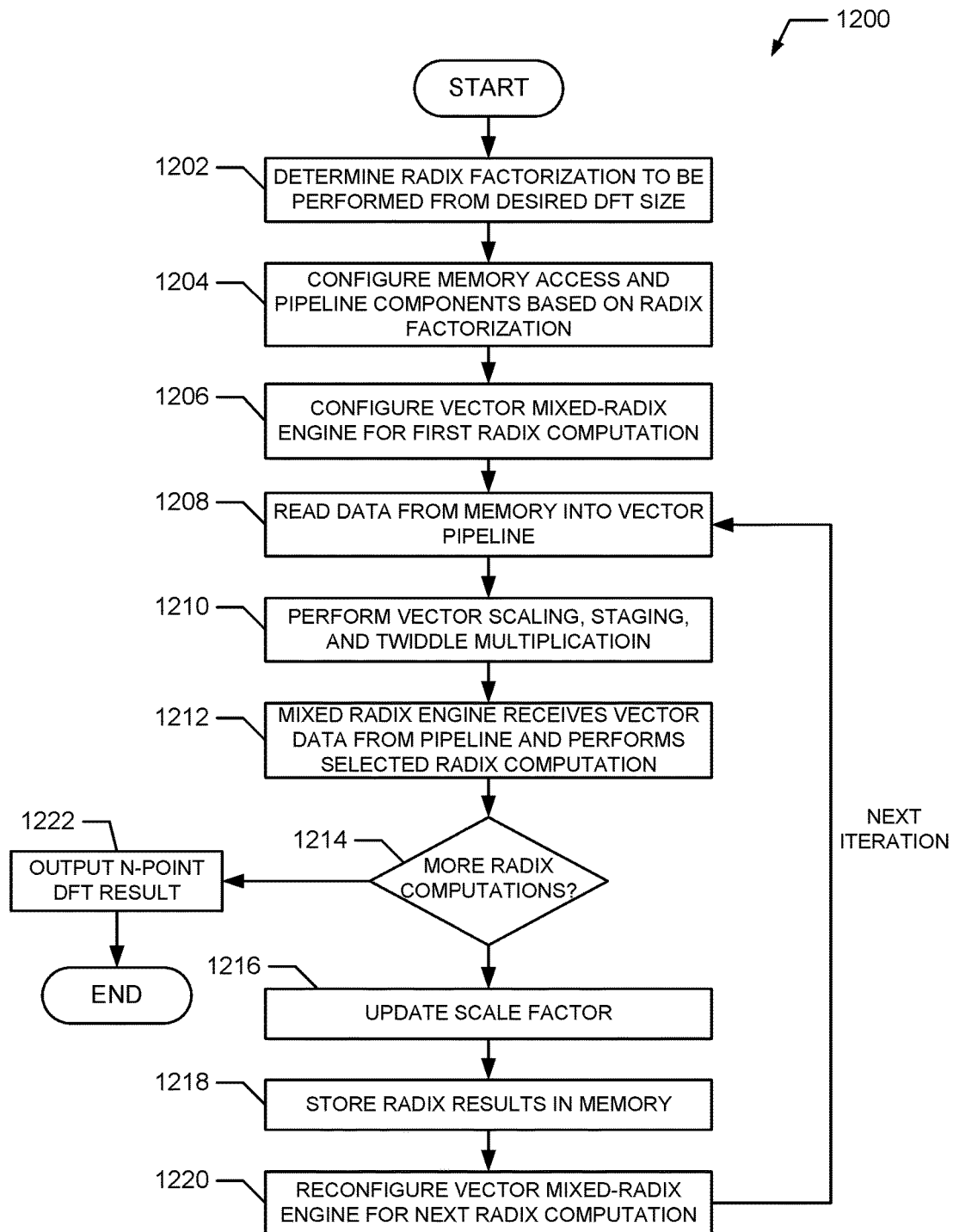
FIG. 12 illustrates an exemplary method for operating a programmable vector processor having a configurable vector mixed-radix engine with iterative pipeline in accordance with embodiments of the invention.

FIG. 12 illustrates an exemplary method 1200 for operating a programmable vector processor having a configurable vector mixed-radix engine with iterative pipeline in accordance with embodiments of the invention. For example, the method 1200 is suitable for use with the PVP 400 shown in FIG. 4.

At block 1202, a radix factorization is determined. For example, a radix factorization is determined to compute an N-point DFT associated with a particular index value. For example, the index value 450 for the N-point DFT to be computed is received at the state machine controller 426, which accesses the configuration information 428 to determine a radix factorization which can be used to compute the DFT.

At block 1204, memory accesses and pipeline components are configured based on the radix factorization. For example, based on the determined radix factorization, the state machine controller 426 determines how many iterations and radix computations it will take to compute the desired DFT. The state machine 426 outputs control signals 452 to the shuffling controller 402 to control how input data is stored in the memory 404. The state machine 426 outputs control signals 454 to control how memory addresses and control signals are generated by the address generator 424. These addresses and control signals are used control how data is transmitted through the vector pipeline 448 and the vector feedback path 484 for each iteration of the DFT computation.

At block 1206, the configurable vector mixed-radix engine is configured to perform a first radix computation. For example, the state machine 426 outputs radix control signals 460 to the program controller 448 and the programmer 514 uses these signals to configure the stages (S0-S5) (e.g., vector engines) of the mixed-radix engine 500 to perform the selected radix computation, such as a radix3, radix4, radix5, or radix 6 computation. For example, the stages are configured to one of the configurations shown in FIG. 10 to perform the selected radix computation.

At block 1208, vector data is read from the memory into the vector pipeline. For example, input data stored in the memory 404 is read out and input to the pipeline 448. In an exemplary embodiment, the vector data is input to the pipeline 448 at a rate of 12 samples per cycle.

At block 1210, vector scaling, staging, and twiddle factor multiplication of the vector data is performed. For example, the vector data is scaled by the scaling unit 408, staged by the staging buffer 410, and multiplied by twiddle factors at the twiddle multiplier 412.

At block 1212, the selected radix computation is performed. For example, the mixed-radix engine 500 performs the selected radix computation, such as a radix3, radix4, radix5, or radix 6 computation) as configured by the programmer 514.

At block 1214, a determination is made as to whether additional radix computations are required to complete the computation of the desired DFT. If additional radix computations are required, the result is output on the vector feedback path 484 to the staging buffer 416 and the method proceeds to block 1216. If no additional computations are required and the computation of the DFT is complete, the method proceeds to block 1222.

At block 1216, a scaling factor is updated. For example, the results of the radix computation flow to the scaling factor calculator 418, which calculates a new scaling factor and outputs this scaling factor 466 to the scaling unit 408.

At block 1218, the result of the radix computation is stored in memory. For example, the results of the radix computation a stored in the memory 404 by the vector store unit 420. In an exemplary embodiment, the radix result is stored (in-place) at the same memory locations as the initial data used to compute the result.

At block 1220, the mixed-radix engine 500 is reconfigured to perform the next radix calculation. For example, the state machine 426 outputs radix control signals 460 to the program controller 448 and the programmer 514 uses these signals to configure the stages (S0-S5) (e.g., vector engines) of the mixed-radix engine 500 to perform the next radix computation, such as a radix3, radix4, radix5, or radix 6 computation. For example, the stages are configured to one of the configurations shown in FIG. 10 to perform the selected radix computation. The method then proceeds to block 1208 to perform the next iteration.

At block 1222, the N-point DFT is output. For example, the mixed radix engine 414 outputs the DFT result through the output staging buffer 416 over path 476 to the output interface streamer 430, which is turn streams the result to the buffer 432. The buffer 432 then outputs the DFT result to a downstream entity.

Thus, the method 1200 illustrates a method for operating a programmable vector processor having a configurable vector mixed-radix engine with iterative pipeline in accordance with embodiments of the invention. In an exemplary embodiment, the method is computes an N-point DFT as described above. In another exemplary embodiment, the method computes an N-point IDFT. For example, to compute the IDFT, at block 1210, the twiddle factors are adjusted (e.g., sign change) such that the result is an IDFT. Accordingly, the method 1200 operates to compute either a DFT or an IDFT in accordance with the exemplary embodiments.

While particular embodiments of the present invention have been shown and described, it will be obvious to those skilled in the art that, based upon the teachings herein, changes and modifications may be made without departing from this exemplary embodiments of the present invention and their broader aspects. Therefore, the appended claims are intended to encompass within their scope all such changes and modifications as are within the true spirit and scope of these exemplary embodiments of the present invention.

What is claimed is:

1. An apparatus, comprising:
a memory bank;
a vector data path pipeline coupled to the memory bank, wherein the vector data path pipeline includes a vector scaling unit that receives vector data from the memory bank and outputs scaled vector data; and
a configurable mixed radix engine coupled to the vector data path pipeline, wherein the configurable mixed radix engine is configurable to perform a radix computation selected from a plurality of radix computations, and wherein the configurable mixed radix engine performs the selected radix computation on data received from the memory through the pipeline to generate a radix result.

2. The apparatus of claim 1, wherein the radix computation is selected from a set of radix computations comprising radix3, radix4, radix5, and radix6 computations.

3. The apparatus of claim 2, further comprising a controller that generates a radix factorization to compute an N-point digital Fourier transform (DFT).

4. The apparatus of claim 3, wherein the controller controls how many radix computation iterations to compute the N-point DFT based on the radix factorization, wherein for each iteration data is moved from the memory bank through the vector data path pipeline to the configurable mixed radix engine to perform a radix computation determined by the radix factorization.

5. The apparatus of claim 1, further comprising a vector feedback data path, and wherein the configurable mixed radix engine writes radix results to the memory bank using the vector feedback data path.

6. The apparatus of claim 5, wherein the vector feedback data path comprises a scaling factor calculator that determines scaling factors from the radix results.

7. The apparatus of claim 1, further comprising an output buffer, and wherein the configurable mixed radix engine outputs a final DFT result using the output buffer.

8. The apparatus of claim 1, wherein the vector data path pipeline comprises a twiddle multiplier that multiples the scaled vector data by twiddle factors.

9. The apparatus of claim 8, further comprising a twiddle generator that generates the twiddle factors.

10. The apparatus of claim 1, further comprising a vector memory address generator that generates addresses used to write data into the memory bank and read data from the memory bank.

11. The apparatus of claim 1, wherein the vector data path pipeline carries twelve data values per clock cycle.

12. A method for performing an N-point DFT, comprising:
determining a radix factorization to compute the N-point DFT, the radix factorization determining one or more radix calculations to be performed; and
performing an iteration for each radix calculation, wherein each iteration comprises:
reading data from a memory bank into a vector data path pipeline;
configuring a configurable mixed radix engine to perform a selected radix calculation;
performing the selected radix calculation on the data in the vector data path pipeline;
storing a radix result of the selected radix calculation back into the memory bank, if the current iteration is not the last iteration;
outputting the radix result of the selected radix calculation as the N-point DFT result, if the current iteration is the last iteration; and
scaling the vector data from the memory bank to generate scaled vector data.

13. The method of claim 12, wherein the operation of configuring the configurable mixed radix engine comprises configuring the configurable mixed radix engine to perform a selected one of radix 3, radix 4, radix 5, and radix 6 computations.

14. The method of claim 12, wherein the operation of storing comprises storing the radix result of the selected radix calculation back into the memory bank using a vector feedback data path.

15. The method of claim 12, further comprising multiplying the scaled vector data by twiddle factors.

16. The method of claim 15, further comprising generating the twiddle factors.

17. The method of claim 12, further comprising generating addresses used to write data into the memory bank and read data from the memory bank.

18. The method of claim 12, further comprising configuring the vector data path pipeline to carry twelve data values per clock cycle.

* * * * *